(No Model.)
J. J. FAULKNER.
COTTON SEED DELINTER.
No. 557,789.  Patented Apr. 7, 1896.
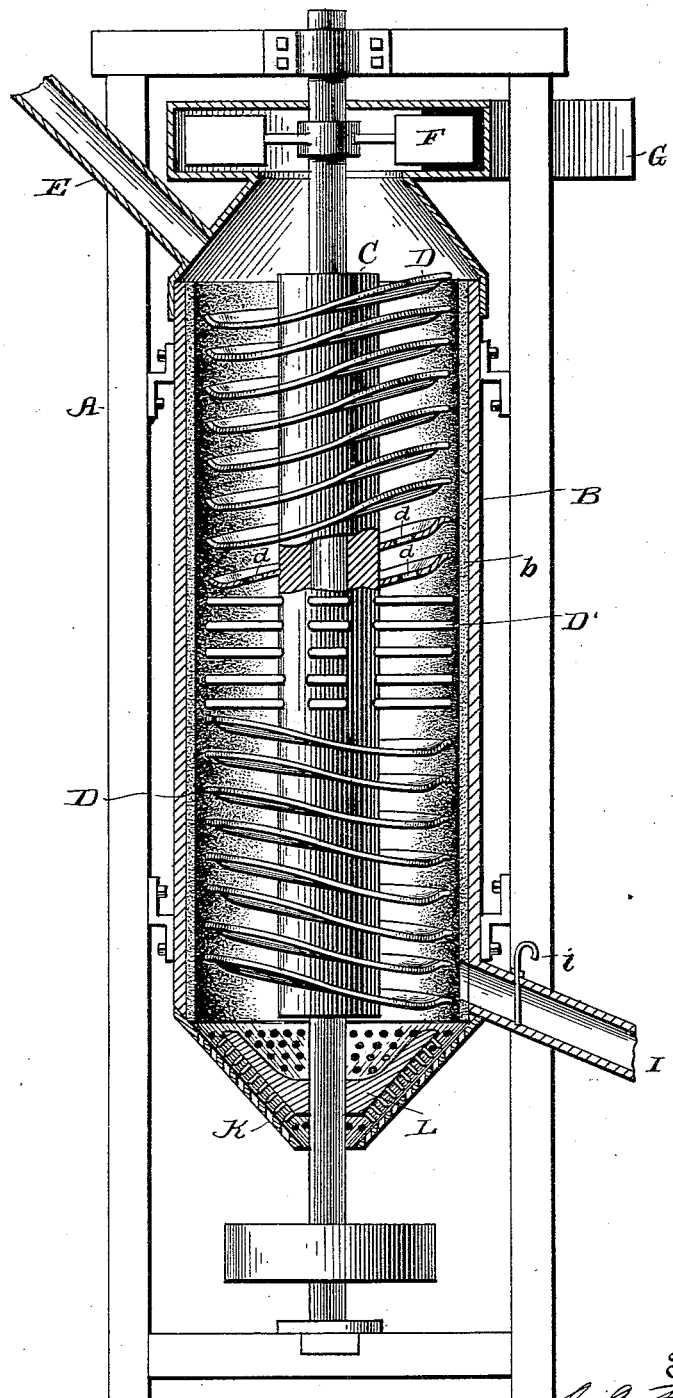
Witnesses
Victor J. Evans.
Marie Wilson
Inventor
J. J. Faulkner
by E. M. Marble & Sons
Attorneys

United States Patent Office.

JAMES J. FAULKNER, OF MEMPHIS, TENNESSEE, ASSIGNOR, BY DIRECT AND MESNE ASSIGNMENTS, TO THE STANDARD COTTON SEED COMPANY, OF ARKANSAS.

COTTON-SEED DELINTER.

SPECIFICATION forming part of Letters Patent No. 557,789, dated April 7, 1896.

Application filed June 13, 1895. Serial No. 552,618. (No model.)

*To all whom it may concern:*

Be it known that I, JAMES J. FAULKNER, a citizen of the United States, residing at Memphis, in the county of Shelby and State of Tennessee, have invented certain new and useful Improvements in Cotton-Seed Delinters; and I do hereby declare the following to be a full, clear, and exact description of the invention, such as will enable others skilled in the art to which it appertains to make and use the same.

My invention relates to improvements in machines for treating cotton-seed, and particularly to improvements in that class thereof known as "delinters;" and it consists in the improved cotton-seed delinter whose construction and arrangement of parts will be hereinafter described, and particularly pointed out in the claims.

In an application for Letters Patent filed by me on June 3, 1895, Serial No. 551,560, I have described a cotton-seed delinter in which the lint is removed from the surface of the seed under treatment by causing the seed to assume a rapid centrifugal movement in a casing whose inner surface is lined with a smooth abrading substance. The scouring action on the seed thus produced results in the complete removal of all lint adhering to the seed, the lint being drawn away by a central air-current and the seed discharged through a suitable discharge-opening.

My present invention belongs to the same class of delinters as that to which the delinter described in the above-referred-to application belongs, but differs therefrom in that the casing is arranged in this case vertically instead of horizontally, and also in the fact that the centrifugal movement of the seed is caused by revolving disks mounted upon a central shaft, instead of by longitudinal blades, as was the case in the construction referred to.

In my present invention I also aim to provide means for interrupting the downward passage of the seed through the machine and for causing the downward passage of the seed to be somewhat slower than would otherwise be the case, thereby insuring a more thorough treatment of the seed.

My invention is fully represented in the drawing which accompanies and forms a part of this application, in which the same reference-letters refer to the same or corresponding parts, and in which a central longitudinal section of my machine is represented.

Referring to the drawing, A represents the machine-frame, to which is secured a casing B. This casing is vertically arranged, as shown, and is provided with a lining of a smooth abrading material $b$, it being necessary in machines of this class that the abrading lining be free from breaks or ridges, in order that the passage of the stock through the machine may be insured. Upon the central shaft C, which extends through the casing, are mounted a number of conveyer-disks D. These disks, by their rapid rotation, cause the seed, which is fed into the machine through the feed-spout E, to assume a rapid centrifugal movement in the casing, the resultant scouring of the sides of the seed causing the removal therefrom of all of the lint adhering thereto. The lint removed is drawn upward by the air-current caused to exist in the machine by the exhaust-fan F and is discharged through the air-flume G. To facilitate the removal of the lint, I sometimes form the disks with a circular opening $d$, as shown, between the center and periphery of the disks; but this is not a feature essentially important. The seed, after it has become cleaned, is discharged through the discharge-spout I, in quantities regulated by its condition, the valve $i$ being used to control the discharge. The dirt which is separated from the seed by the delinting operation, and which is too heavy to be drawn upward by the air-current caused by the exhaust-fan F, falls to the bottom of the machine and is forced through the perforations K thereof by the revolving sweep L. In this manner accumulation of dirt and impurities upon the bottom of the casing is effectually prevented.

The disks D, which act as conveyers of the seed, insuring its passage through the machine, as well as imparting to the same centrifugal movement, are placed upon the central shaft at angles which differ at different portions of the machine. At the head or feed end of the machine the disks are arranged in such a spiral as to tend to feed the seed into the machine. At the bottom of the machine the disks are arranged at such an angle as to retard the downward passage of the seed, thereby causing the seed to be subjected still longer to the abrading action, and at the central portion of the machine I use instead of the disks projecting pins D', which act as beaters to throw the seed against the sides of the casing.

The operation of my machine is as follows: Seed fed into the machine through the feed-spout E is at once given a rapid centrifugal movement by the revolution of the conveyer-disks D, is at first fed through the machine by reason of the spiral inclination of such disks, is then subjected to the action of the beater-arms D', and is finally discharged through the discharge-opening I in quantities regulated by its condition, though its downward passage through the latter portion of the machine is retarded by the angle of inclination of the disks D, which are stationed at that point. The seed, while subjected in a measure to the inclination and form of the surfaces which cause the same to assume a centrifugal movement in the machine, still forms itself into a roll around the emery lining of the casing, the abrading action taking place by reason of the force with which the seed are impelled around the same. The revolving disks D and beater-arms D' serve to interrupt and vary the formation of the roll of seed and to cause new faces of the seed to be continually presented to the abrading-surfaces.

The lint scoured off the seed by the abrading action is drawn upward by the air-current caused by the fan F and is discharged into the air-flume G. The coarse dirt and impurities gather in the central portion of the casing on account of their small specific gravity, fall upon the perforated bottom of the casing, and are forced through the same by the revolving sweep L.

Having thus fully described my invention, what I claim as new, and desire to secure by Letters Patent, is—

1. In a cotton-seed delinter, the combination with a casing lined with abrading material, of seed inlet and discharge openings, a shaft extending through said casing, a series of disks mounted on said shaft, said disks being inclined at different angles to the casing at different portions thereof, and means for causing a central air-current to remove the lint separated from the seed by the action of the machine, substantially as described.

2. In a cotton-seed delinter, the combination with a casing lined with abrading material, of seed inlet and discharge openings, a central shaft, the disks D mounted on said shaft, said disks being inclined at different angles to the casing at different portions thereof, the beater-arms D', and means for producing an air-current to remove the lint separated from the seed by the action of the machine, substantially as described.

3. In a cotton-seed delinter, the combination with a casing lined with abrading material, of seed inlet and discharge openings, a central shaft, disks mounted thereon provided with a circular opening between the center and periphery thereof, and means for producing a central air-current to remove the lint separated by the action of the machine, substantially as described.

In testimony whereof I affix my signature in presence of two witnesses.

JAMES J. FAULKNER.

Witnesses:
R. W. RAMSEY,
JOHN HALLUM.